United States Patent [19]

Ohtani

[11] Patent Number: 4,563,555

[45] Date of Patent: Jan. 7, 1986

[54] CONSTRUCTION OF CONTROL SWITCH

[75] Inventor: Shigeru Ohtani, Kawasaki, Japan

[73] Assignee: Mitutoyo Mfg. Co., Ltd., Tokyo, Japan

[21] Appl. No.: 570,140

[22] Filed: Jan. 12, 1984

[30] Foreign Application Priority Data

Jan. 19, 1983 [JP] Japan .................... 58-7855

[51] Int. Cl.⁴ ................ H01H 3/00; H01H 25/00
[52] U.S. Cl. ................... 200/52 R; 200/16 A; 200/17 R; 200/153 L
[58] Field of Search ............... 200/16 R, 16 A, 61.27, 200/52 R, 61.54, 61.85, 159 R, 159 A, 156, 155, 314, 340, 337, 335, 153 L, 153 LA; 368/187–189, 192, 199, 250, 254, 319–321

[56] References Cited

U.S. PATENT DOCUMENTS

| 2,422,097 | 6/1947 | Hansen | 200/16 A X |
|---|---|---|---|
| 2,758,169 | 8/1956 | Weide | 200/16 A X |
| 2,917,611 | 12/1959 | Houston | 200/155 R |
| 3,674,970 | 7/1972 | Bedocs | 200/340 X |
| 3,867,591 | 2/1975 | Nordeen | 200/52 R |
| 4,088,854 | 5/1978 | Yajima | 368/192 X |
| 4,153,829 | 5/1979 | Murata | 200/340 |
| 4,249,055 | 2/1981 | Matsuo | 200/340 X |
| 4,263,666 | 4/1981 | Murata | 368/188 X |
| 4,364,674 | 12/1982 | Tesch | 368/319 |

*Primary Examiner*—J. R. Scott
*Attorney, Agent, or Firm*—Flynn, Thiel, Boutell & Tanis

[57] ABSTRACT

The present invention relates to a construction of a control switch for use in measuring instruments of various types, such as digital indication type slide calipers. A link member is pivotally supported and pivoting thereof is effected by a movement of a control button. The link member is interposed between a switch portion for effecting the electrical connection or disconnection and the control button, which control button is provided in a side wall of a case body disposed for movement in a direction perpendicular to the working direction of the switch portion, and, when the link member is pivoted by movement of the control button, the electrical connection or disconnection can be effected.

5 Claims, 8 Drawing Figures

CONSTRUCTION OF CONTROL SWITCH

BACKGROUND OF THE INVENTION

1. Filed of the Invention

This invention relates to a construction of a control switch, and more particularly to improvements in construction of a control switch wherein the operating direction (press-in direction) of a control button and the working direction of a switch portion operated by this control button are different from each other.

2. Description of the Prior Art

In each of small-size electrical apparatuses, the arrangement of an electric circuit, an indication unit and the like, which are incorporated in the main body of apparatus is restricted and a number of restrictions are imposed on the mounting position of the control button in order to meet the needs of the handling operation. For example, in the digital indication type slide calipers as being a portable measuring instrument, to meet the needs of rendering the slider compact (thin in thickness), the electric circuit and control unit must be arranged in the planar direction of the slider, while, it is required to secure the control button on a portion where the thumb is positioned when the main scale of the slide calipers is grasped by the hand, i.e., at one side edge of the slider in order to operate the slider. In this case, it is normal that the working direction of a switch portion for effecting electrical connection or disconnection is perpendicular to the planar direction of the slider, and the operating direction of the control button is perpendicular to the working direction of the switch portion, i.e., in the planar direction of the slider. As shown in FIG. 1, the conventional constructions of the control switch used when the operating direction of the control button is different from the working direction of the switch portion as described above have been such that a spring 2 having the forward end portion bent to be a circularly arcuate shape and the fixed tip end is secured to the control button 1, and the control button 1 is pressed in toward the fixed tip end to move the bent portion 2A in a direction substantially perpendicular to the pressed-in direction, to thereby operate the switch portion 3 arranged to have a working direction substantially perpendicular to the aforesaid pressed-in direction. However, the conventional construction of the type described has been disadvantageous in that the spring 2 tends to deteriorate due to the deformation, lacks the reliability and has a short service life. As shown in FIG. 2, there has been a construction in which a tapered member 4 is used in place of the spring 2. However, this construction has been also disadvantageous in that the construction, applying a tilting force to the switch portion 3 to operate the switch portion 3, lacks the reliability and has a short service life of the switch portion 3 similarly to the above-described conventional construction.

SUMMARY OF THE INVENTION

The present invention has as its object the provision of construction of a control switch, in which a switch portion is reliably operated which has the working direction being disposed in a direction different from the operating direction (pressed-in direction) of a control button, deterioration due to the deformation is low in various portions thereof and the service life thereof is extended.

To this end, the present invention contemplates that there are provided a switch portion for effecting the electrical connection or disconnection, a control button, the operating direction of which is different from the working direction of the switch portion and a link member rotatable by the control button, and, when the control button is operated in the operating direction, the link member is rotated, whereby a portion of the link member abuts against and presses the switch portion in the working direction of the switch portion to effect the electrical connection or disconnection of the switch portion.

DETAILED DESCRIPTION OF THE PREFERRED EMBODIMENT

Description will hereunder be given of embodiments of the present invention with reference to the drawings.

Figure 1:
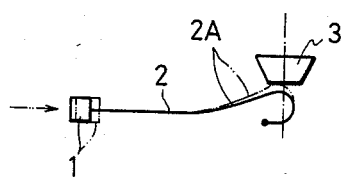
FIGS. 1 and 2 are explanatory views showing the outlines of arrangements of the conventional constructions different from each other.
Figure 2:
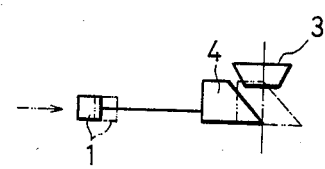
Figure 3:
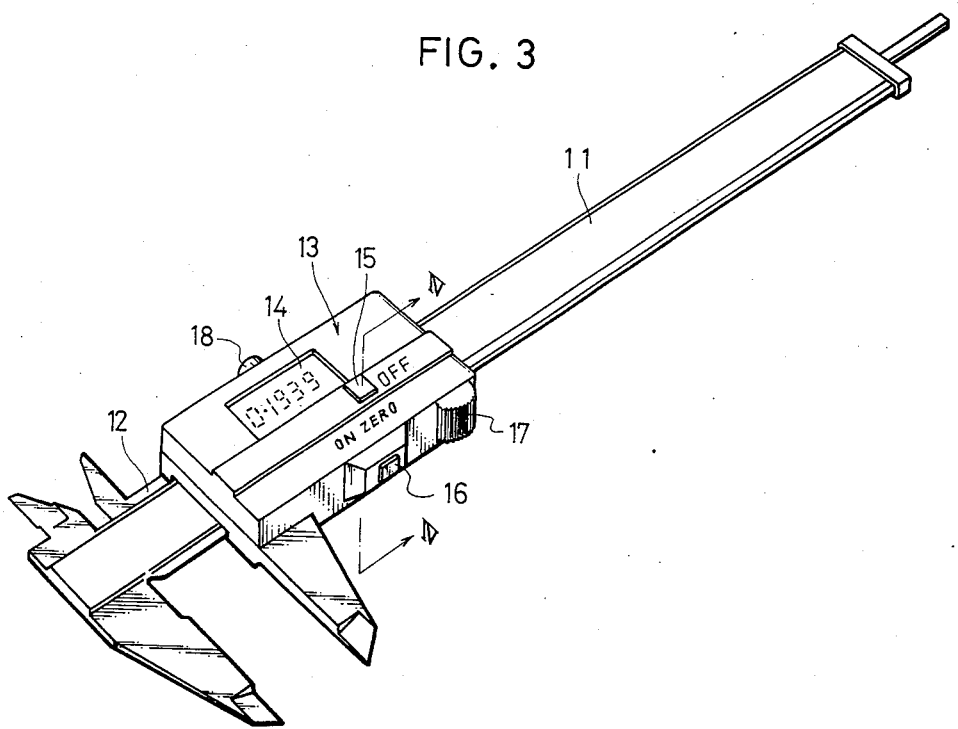
FIG. 3 is a perspective view showing the general arrangement of an embodiment, in which the construction of the control switch according to the present invention is applied to the digital indication type slide calipers.

FIG. 3 shows one embodiment in which the construction of the control switch according to the present invention is applied to digital indication type slide calipers. In the drawing, a slider 12 is slidably coupled onto a main scale 11, and a case body 13 is solidly secured to the slider 12. An indication portion 14 for digitally indicating a measured value and a button 15 exclusively used for OFF operation are provided on the front surface of the case body 13. A control button 16 and a knob (fingergrip) 17 are provided on one side edge of the case body 13 and a clamp screw 18 is provided on the other side edge.

Figure 4:
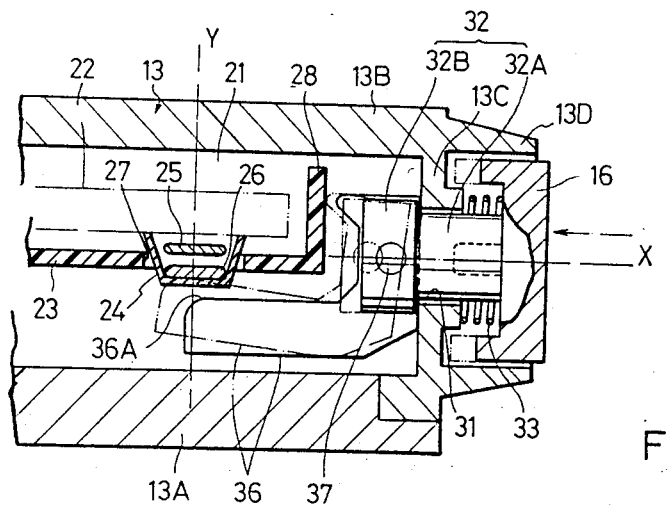
FIG. 4 is an enlarged sectional view taken along the line IV–IV of FIG. 3.

As shown in FIG. 4, the case body 13 comprises a back cover 13A and an inversed tray-shaped outer cover 13B to be secured to the back cover 13A. A space 21 is formed in the case body 13. Furthermore, the back cover 13A is directly secured to the slider 12. In the space 21, there is provided a substrate 22 as being an electric circuit in the planar direction of the outer cover 13B. This substrate 22 is fixed to the case body 13 through an electrically insulated inner case 23, the aforesaid indication portion 14 is projectingly provided on the substrate 22, and a switch portion 24 is projected from the substrate 22 toward the back cover 13A.

The switch portion 24 has a pair of contact points 25 and 26 spaced from one another by a predetermined distance. These contact points 25 and 26 are opened when not subjected to an external force, but, are closed when subjected to an external force from below and operating in the vertical direction in FIG. 4. Here, the working direction of the switch portion 24 is a direction of Y-axis in the drawing. Additionally, the inner case 23 has an insertion hole 27 for loosely receiving there-through the switch portion 24 and a side wall thereof is formed into a stationary member 28.

A cylindrical protrusion 13D is outwardly projectingly provided on a side wall 13C of the outer cover 13B, and control button 16 is linearly movably received, in this protrusion 13D. Furthermore, a round hole 31 providing communication between the interior of the case body 13 and the exterior thereof is penetratingly provided in the side wall 13C, and a small diameter portion 32A of a stepped round rod-shaped connecting shaft 32 is inserted into and held in the round hole 31 in a manner to be linearly movable in the lateral direction in the drawing. A large diameter portion 32B of the connecting shaft 32 is disposed in the case body 13 and formed to have a large diameter as compared with the round hole 31, whereby the connecting shaft 32 is prevented from falling out of the case member 13. The end portion of the small diameter portion 32A, which is disposed in the protrusion 13D, has solidly, secured thereto the control button 16. A compression coil spring 33 is confined between the side wall 13C and the control button 16 and encircles the small diameter portion 32A. Here, the operating portion of the control button 16 operates reciprocally in a direction of the X-axis in the drawing. Furthermore, the lines of the X-axis and the Y-axis cross each other at a right angle.

Figure 5:
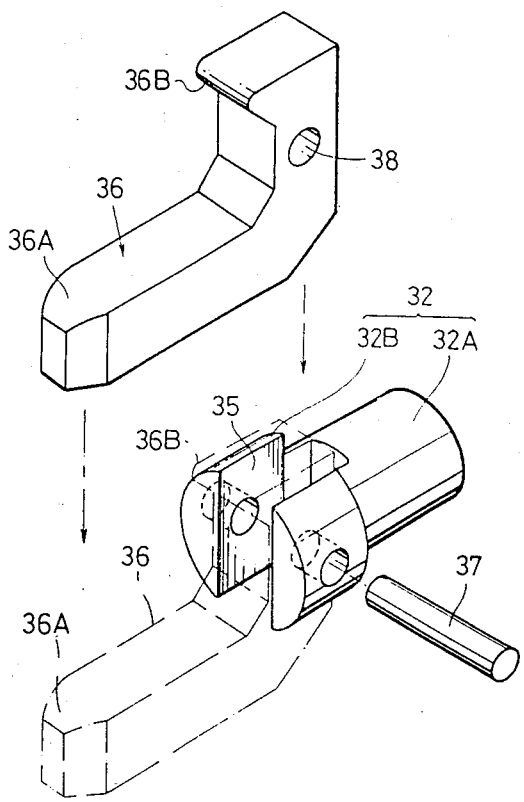
FIG. 5 is an enlarged, disassembled perspective view showing the essential portions of the above embodiment.

As shown in FIG. 5, the end portion of the connecting shaft 32, which is disposed in the case body 13, has formed therein with a cutaway portion 35 in the vertical direction in the drawing, and a link member 36 is provotally mounted in this cutaway portion 35 by a pivot axle 37. In other words, the link member 36 is rotatably connected to the control button 16 through the connecting shaft 32.

The link member 36 is formed into an L-shape, the pivot axle 37 is inserted through a small hole 38 provided adjacent the angle of the bend of the link member 36 to be supported on the large diameter portion 32B, and, as shown in FIG. 4, one side portion of the link member 36 extends through a space formed between the inner case 23 and the back cover 13A toward the switch portion 24 to reach a position substantially directly underneath the switch portion 24. The top end face of this forward end portion of the link member 36 constitutes a switch press-in portion 36A. In other words, the switch press-in portion 36A is disposed close to a position underneath the switch portion 24 in the working direction (direction of Y-axis) of the switch portion 24. The other side of the link member 36 extends a predetermined length vertically upwardly from the pivot axle 37 in the drawing, and an abutment portion 36B projecting toward the stationary member 28 is formed on the forward end portion of the link member 36.

Description will hereunder be given of the operation of this embodiment.

When nothing touches the control button 16, the connecting shaft 32 is biased by the spring 33 to the right in the illustration of FIG. 4, the outer side surface on one side of the link member 36 abuts against the inner peripheral surface of the side wall 13C, the switch press-in portion 36A of the link member 36 is spaced a predetermined distance away from the switch portion 24, and the abutment portion 36B is spaced a predetermined distance away from the stationary member 28. When the control button 16 is pressed in to the left in the direction of the X-axis in FIG. 4 from the above position, the connecting shaft 32 proceeds to the left against the biasing force of the spring 33. When the connecting shaft 32 proceeds to the left, the abutment portion 36B of the link member 36 rotatably supported by this connecting shaft 32 abuts against the stationary member 28, whereby the link member 36 is rotated about the pivot axle 37 in the clockwise direction in the drawing. Along with this rotation, the switch press-in portion 36A moves upwardly substantially in the direction of the Y-axis, i.e., the working direction of the switch portion 24, to thereby bring the both contact points 25 and 26 into contact with each other, that is, close the switch portion 24. In this case, the abutment portion 36B slides on the stationary member 28.

When the force pushing the control button 16 is released, the control button 16 is pushed back by the biasing force of the spring 33 to the right, whereby the link member 36 is stopped at the position shown by solid lines in FIG. 4, so that the switch portion 24 can be opened again.

The embodiment as described above can offer the following advantages.

This embodiment, being such that the switch portion 24 is operated through the utilization of the rotation of the link member 36 during the operation of the control button 16, which is different from the case of utilizing the deformation of the spring, has no possibility of causing an unreliable operation by the deterioration due to the deformation. In consequence, even in the use for a long period of life, the switch portion 24 can be reliably operated. Furthermore, the switch press-in portion 36A is adapted to move substantially in the working direction (direction of Y-axis) of the switch portion 24 to press in the switch portion 24. In consequence, in looking from this point, the electrical connection or disconnection at the switch portion 24 can be reliably effected, and further, since the tilting or pivoting force is not applied to the switch portion 24, such an advantage can be offered that an extended service life of the switch portion 24 itself can be achieved.

Further, only two parts, namely, the connecting shaft 32 and the link member 36, constitute the mechanism for transmitting the motion of the control button 16 to the switch portion 24, and, since each of these parts has a very simple construction, and the general arrangement of the mechanism is simplified, the mechanism is readily applicable a very compact (thin) case body 13. Moreover, as viewed from the fact that the stationary member 28 is provided on a portion of the inner case 23, i.e., the inner case 23 itself additionally functions as the stationary member 28, such advantages can be offered that the number of parts is small as a whole, the construction is simplified, tough and the reliability in operation is high.

Figure 6:
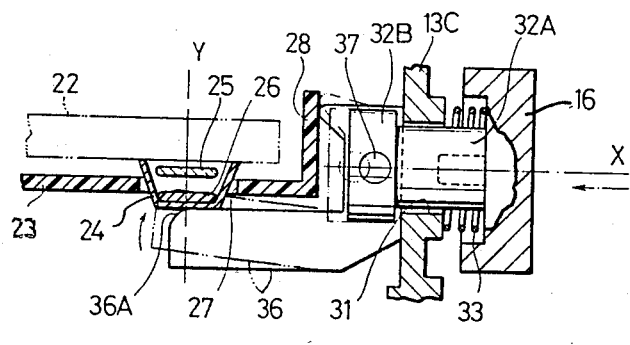
FIGS. 6, 7 and 8 are each a sectional view showing alternate embodiments.

In working, the switch press-in portion 36A and the abutment portion 36B of the link member 36 are both positioned by the spring 33 to be spaced predetermined distances apart from the switch portion 24 and the stationary member 28, respectively, when the control button 16 is not operated. However, such an arrangement may be adopted that, as in an embodiment other than the preceding one, as shown in FIG. 6, when the control button 16 is not operated, the switch press-in portion 36A contacts the switch portion 24 and the abutment portion 36B contacts the stationary member 28, respectively, and, when the control button 16 are pressed in against the biasing force of the spring 33, the abutment portion 36B slides upwardly in the drawing, while keeping the contact with the stationary member 28, and simultaneously, the switch press-in portion 36A presses the switch portion 24 vertically upwardly in the drawing, to thereby operate (close) the switch portion.

Figure 7:
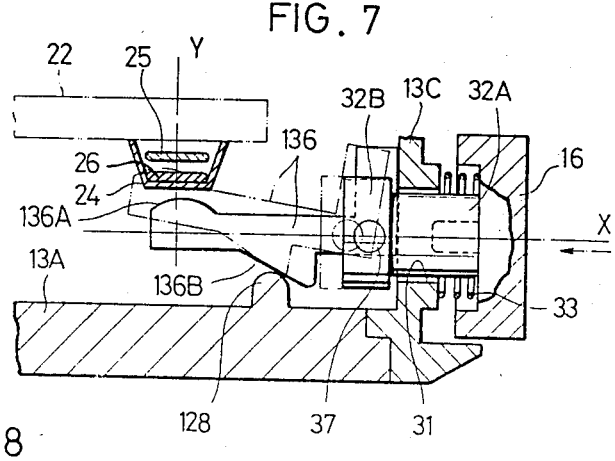

In the foregoing, the arrangement has been such that the link member 36 is formed into the L-shape and connected to the control button 16 through the connecting shaft 32 having the pivot axle 37 interposed between the switch press-in portion 36A and the abutment portion 36B. However, such an arrangement may be adopted that, as in a link member 136 in an embodiment other than the above as shown in FIG. 7, a switch press-in portion 136A and an abutment portion 136B are provided on the same side with respect to the pivot axle 37. More specifically, in the embodiment shown in FIG. 7, the link member 136 extends from the pivot axle 37 to a position substantially underneath the switch portion 24 in the drawing, is formed at one end positioned underneath the switch portion 24 in the direction of the Y-axis with the switch press-in portion 136A, while, the substantially triangular abutment portion 136B is projectingly provided at a position underneath the intermediate portion between the switch press-in portion 136A and the pivot axle 37 in the drawing. Furthermore, a stationary member 128 is projectingly provided on a back cover 13A, and, when the control button 16 is pressed in to the left along the line of the X-axis in the drawing, an inclined surface of the abutment portion 136B abuts against the stationary member 128 to define a cam which effects a rotating of the link member 136 about the pivot axle 37 in the clockwise direction, whereby the switch press-in portion 136A presses in the switch portion 24 substantially in the working direction (direction of Y-axis) of the switch portion 24. Even in this embodiment, the same function and effects can be achieved as in the preceding embodiments.

Figure 8:
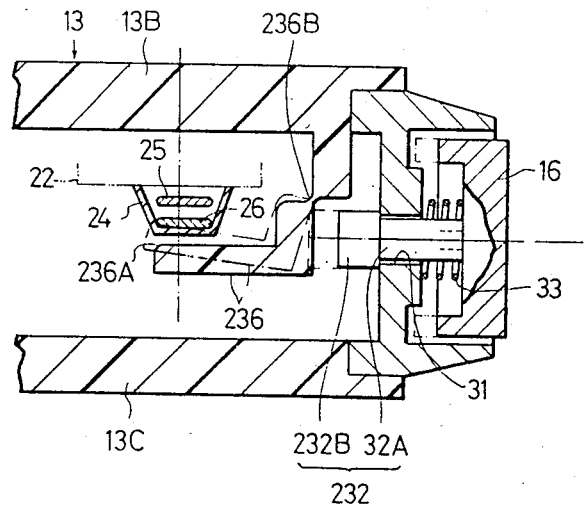

Further, in the respective embodiments described above, the arrangement has been such that the link member 36 or 136 is rotatably connected to the large diameter portion 32B of the control, button 32 through the pivot axle 37. However, such an arrangement may be adopted that, as shown in FIG. 8, a substantially crank-shaped link member 236 is integrally formed on the inner surface portion of the outer cover 13B. This link member 236 is made of a synthetic resin material, for example, and provided at a position upwardly and slightly forwardly of the large diameter portion 232B of the control button 16 in the drawing with a hinge portion 236B. The switch press-in portion 236A of the link member 236 is rotated about this hinge portion 236B as being a fulcrum of the rotation in the switch press-in direction. In addition, the large diameter portion 232B in this embodiment is formed of a solid round shaft unlike in the above embodiments.

In the embodiment of the type described, in addition to the advantages achieved in the above embodiments, the construction can be more simplified and the adjustment in assembling of the link member 236 can be facilitated.

In the foregoing, the working direction (direction of Y-axis) of the switch portion 24 and the operating direction (direction of X-axis) of the control button 16 have perpendicularly intersected each other, however, such an arrangement may be easily adopted that the both directions cross at an angle other than right angle. Further, the link member 36 or 136 has been connected to the control button 16 through the connecting shaft 32, however, such an arrangement may be adopted that the control button 16 is integrally formed with the connecting shaft 32 and so forth, whereby the link member 36 or 136 is directly connected to the control button 16.

The application of the construction of the control switch according to the present invention need not necessarily be limited to the slide calipers, but, may be made to portable or unportable measuring instruments other than the slide calipers, and further, to various electrical apparatuses other than the measuring instruments.

As has been described above, the present invention can provide the construction of the control switch, in which the switch portion can be reliably operated even when the operating direction of the control switch is different from the working direction of the switch portion and the service life thereof is extended.

What is claimed is:
1. A control switch, comprising:
a case body;
switch means for effecting an electrical connection or disconnection, said switch means beig normally opened and including a pair of contacts, one of said contacts being movable in a working direction;
a control button, the operating direction of which is different from said working direction of said switch means, said control button being movably supported on said case body;
a link member having a proximal end directly engaged by said control button and a distal end press-s-in portion normally spaced from but adapted to be brought into contact with and separated from said switch means;
pivot means supporting said link member for pivoting movement relative to said case body so that said press-in portion thereof is moved into engagement with said switch means to cause said one of said contacts thereof to move toward the other in response to said proximal end portion being moved by the operation of said control button in said operating direction thereof and engagement of said control button with said proximal end portion; and
a stationary member fixed to said case body and being static irrespective of the motion of said link member, said proximal end having a pair of spaced portions thereon, said pivot means effecting a pivotal support of said link member on said control button at a first portion of said proximal end, an abutment portion on a second portion of said proximal end and on a side of said pivot means opposite said first portion so that a pivoting of said link member is promoted by abutting of said abutment portion against said stationary member as said control button is moved in said operating direction.

2. A switch as set forth in claim 1, wherein said link member has an L-shape, one leg of said L-shaped link member having said distal press-in portion thereon and the other leg thereof having said abutment portion thereon.

3. A construction of a control switch as set forth in claim 2, wherein said abutment portion is located at the free end of said other leg.

4. A control switch as set forth in claim 1, wherein said link member has an L-shape, one leg of said L-shaped link member having said distal press-in portion thereon, said abutment portion being located intermediate the other leg of said L-shaped link member and said distal press-in portion.

5. A switch as set forth in claim 1, wherein said stationary member includes an inwardly projecting member on said case body and is interposed between said control button and said switch means, said abutment portion including an inclined section on one side of said link member slidingly engaging said projecting member, said press-in portion extending from said inclined section to said switch means, said projecting member and said inclined section defining a cam, whereby when said control button is moved in said operating direction, said projecting member and said inclined section will move relative to one another to effect a pivoting of said press-in portion of said link member about said pivot means to cause an electrical connection or disconnection of said switch means.

* * * * *